US010416188B2

(12) United States Patent
Doolittle et al.

(10) Patent No.: US 10,416,188 B2
(45) Date of Patent: Sep. 17, 2019

(54) AIR DATA PROBE WITH TURBULENCE-PRODUCING GEOMETRY

(71) Applicant: Rosemount Aerospace Inc., Burnsville, MN (US)

(72) Inventors: Charles Jae Doolittle, Minneapolis, MN (US); Mackenzie Whalen, New Prague, MN (US); James Barron Egberg, St. Paul, MN (US); Aaron A. Cusher, Eagan, MN (US); Brian Daniel Matheis, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 126 days.

(21) Appl. No.: 15/649,873

(22) Filed: Jul. 14, 2017

(65) Prior Publication Data

US 2018/0017591 A1    Jan. 18, 2018

Related U.S. Application Data

(60) Provisional application No. 62/362,698, filed on Jul. 15, 2016.

(51) Int. Cl.
*G01P 5/165* (2006.01)
*G01L 19/00* (2006.01)
*G01L 19/02* (2006.01)
*G01L 19/14* (2006.01)
*G01P 13/02* (2006.01)

(52) U.S. Cl.
CPC .......... *G01P 5/165* (2013.01); *G01L 19/0007* (2013.01); *G01L 19/02* (2013.01); *G01L 19/14* (2013.01); *G01P 13/025* (2013.01)

(58) Field of Classification Search
CPC ..... G01L 19/0007; G01L 19/02; G01L 19/14; G01P 13/025; G01P 5/165
See application file for complete search history.

(56) References Cited

U.S. PATENT DOCUMENTS 2,404,978 A * 7/1946 Morton ................... G01P 5/165
                                                              219/201
2,984,107 A * 5/1961 Strieby .................. B64D 15/12
                                                              73/312

(Continued)

FOREIGN PATENT DOCUMENTS

EP    2775310 A1    9/2014
EP    2947465 A1    11/2015

OTHER PUBLICATIONS

Examination Report for European Patent Application No. 17179943.0, dated Jun. 1, 2018, 5 pages.

(Continued)

*Primary Examiner* — Francis C Gray
(74) *Attorney, Agent, or Firm* — Kinney & Lange, P.A.

(57) ABSTRACT

An air data probe includes a probe body and an air data sensing port disposed in the probe body. The probe body includes a barrel region, a tapered head region extending forward from the barrel region, and a tip at a forward-most end of the tapered head region. The air data sensing port is disposed in the probe body at a port location aft of the tip. The probe body has a turbulence-producing geometry originating at the tip that produces a turbulent boundary layer of airflow that extends from the tip to the port location.

20 Claims, 8 Drawing Sheets

(56) References Cited

U.S. PATENT DOCUMENTS

| | | | | |
|---|---|---|---|---|
| 3,347,095 A | * | 10/1967 | Strong | G01L 19/0007 |
| | | | | 73/178 H |
| 4,378,697 A | | 4/1983 | DeLeo et al. | |
| 5,062,869 A | * | 11/1991 | Hagen | G01P 5/165 |
| | | | | 96/420 |
| 5,331,849 A | * | 7/1994 | Hedberg | G01P 5/165 |
| | | | | 73/180 |
| 5,359,888 A | * | 11/1994 | Hagen | G01P 1/10 |
| | | | | 73/178 R |
| 6,915,687 B2 | | 7/2005 | Foster et al. | |
| 9,341,533 B2 | | 5/2016 | Doolittle et al. | |
| 2014/0251000 A1 | * | 9/2014 | Doolittle | G01L 15/00 |
| | | | | 73/178 R |

OTHER PUBLICATIONS

Extended European Search Report for European Patent Application No. 17179943.0, dated Jan. 18, 2015, 12 pages.

Gad-El-Hak, Mohamed; Bushnell, Dennis M., Separation Control: Review, Journal of Fluids Engineering, vol. 113, No. 5, Mar. 1, 1991, pp. 5 through 30.

Innes, Fraser, An experimental investigation into the use of vertex generators to improve the performance of a high lift system, Thesis submitted as part of the requirements for the degree of Doctor of Philosophy, Jun. 1, 1995, 37 pages.

Partial European Search Report for European Patent Application No. 17179943.0, dated Oct. 10, 2017, 14 pages.

\* cited by examiner

AIR DATA PROBE WITH TURBULENCE-PRODUCING GEOMETRY

CROSS-REFERENCE TO RELATED APPLICATION(S)

This application claims the benefit of U.S. Provisional Application No. 62/362,698 filed Jul. 15, 2016 for "AIR DATA PROBE WITH TURBULENCE-PRODUCING GEOMETRY" by C. Doolittle, M. Whalen, J. Egberg, A. Cusher, and B. Matheis.

BACKGROUND

The present disclosure relates generally to air data probes, and more particularly to air data probes for use in aerospace applications.

Air data probe devices can be utilized in, e.g., aerospace applications for measuring environmental parameters usable to determine air data outputs. For instance, air data probes can measure pitot pressure, static pressure, or other parameters of airflow across the air data probe that are usable for determining air data outputs, such as pressure altitude, altitude rate (e.g., vertical speed), airspeed, Mach number, angle of attack, angle of sideslip, or other air data outputs. Such air data probes often include one or more air data sensing ports, such as static pressure ports located on the side of the probe integral to the surface of the probe that are pneumatically connected to pressure sensors (e.g., pressure transducers) that sense the atmospheric pressure outside of the aircraft.

Air data probes, via the static pressure ports and corresponding pressure sensors, can provide consistent and accurate pressure measurements that are usable to accurately determine air data outputs over a broad range of aircraft flight envelopes. However, during certain flight conditions, such as at low Reynolds numbers and, e.g., high angles of attack (both positive and negative), it is possible for an air data probe to experience inconsistent pressures at the static ports that can result in less accurate air data output determinations.

SUMMARY

In one example, an air data probe includes a probe body and an air data sensing port disposed in the probe body. The probe body includes a barrel region, a tapered head region extending forward from the barrel region, and a tip at a forward-most end of the tapered head region. The air data sensing port is disposed in the probe body at a port location aft of the tip. The probe body has a turbulence-producing geometry originating at the tip that produces a turbulent boundary layer of airflow that extends from the tip to the port location.

In another example, an air data probe includes a base plate, a probe body, a strut, a first air data sensing port, and a second air data sensing port. The base plate is configured to mount the air data probe to an exterior of an aircraft. The probe body includes a cylindrical barrel region and a tapered head region extending forward from the cylindrical barrel region and terminating at an annular tip. The probe body extends along a longitudinal axis from the annular tip to an aft end of the probe body. The longitudinal axis is parallel to a plane defined by the base plate. The strut extends between the base plate and the probe body. An aft end of the strut is adjacent the aft end of the probe body. The probe body has a first side and a second side with respect to the strut. The first air data sensing port is disposed in the first side of the probe body at a first port location aft of the annular tip. The second air data sensing port is disposed in the second side of the probe body at a second port location aft of the annular tip. The second port location is opposite the first port location. The probe body has a turbulence-producing geometry originating at the annular tip. The turbulence-producing geometry produces a turbulent boundary layer of airflow that extends along an exterior of the probe body from the annular tip to each of the first port location and the second port location.

DETAILED DESCRIPTION

As described herein, an air data probe includes a turbulence-producing geometry originating at a tip of the probe that produces a turbulent boundary layer of airflow over an exterior of the probe to reduce boundary layer separation and thereby increase a consistency of measurements at an air data sensing port location aft of the tip. That is, because the magnitude of an adverse pressure gradient of airflow across a surface required for flow separation to occur is greater for turbulent than for laminar flow, inducement of a turbulent boundary layer can delay flow separation, thereby maintaining an attached boundary layer of airflow over a greater proportion of the surface than would otherwise be experienced with a laminar boundary layer. Boundary layer separation at or near an air data sensing port of the probe can result in inconsistent measurements at the port location. As such, an attached boundary layer of airflow leading to, in the vicinity of, and over the air data sensing port location can help to ensure consistency of port measurements and the corresponding air data outputs.

Turbulence-producing geometry at a tip of the air data probe can be influential in producing the turbulent boundary layer beginning at the forward-most interface of the probe with an oncoming airflow stream. As such, an air data probe implementing the turbulence-producing geometry described herein (originating at a tip of the probe) can help to ensure that an air data sensing port disposed on the probe at any location aft of the tip experiences attached boundary layer flow (i.e., attached turbulent boundary layer flow) for an entire defined flight envelope of an aircraft, such as a flight envelope including relatively low Reynolds numbers on the order of $10^6$ m$^{-1}$ where laminar boundary layer flow may otherwise separate at or near the air data sensing port location.

Figure 1:
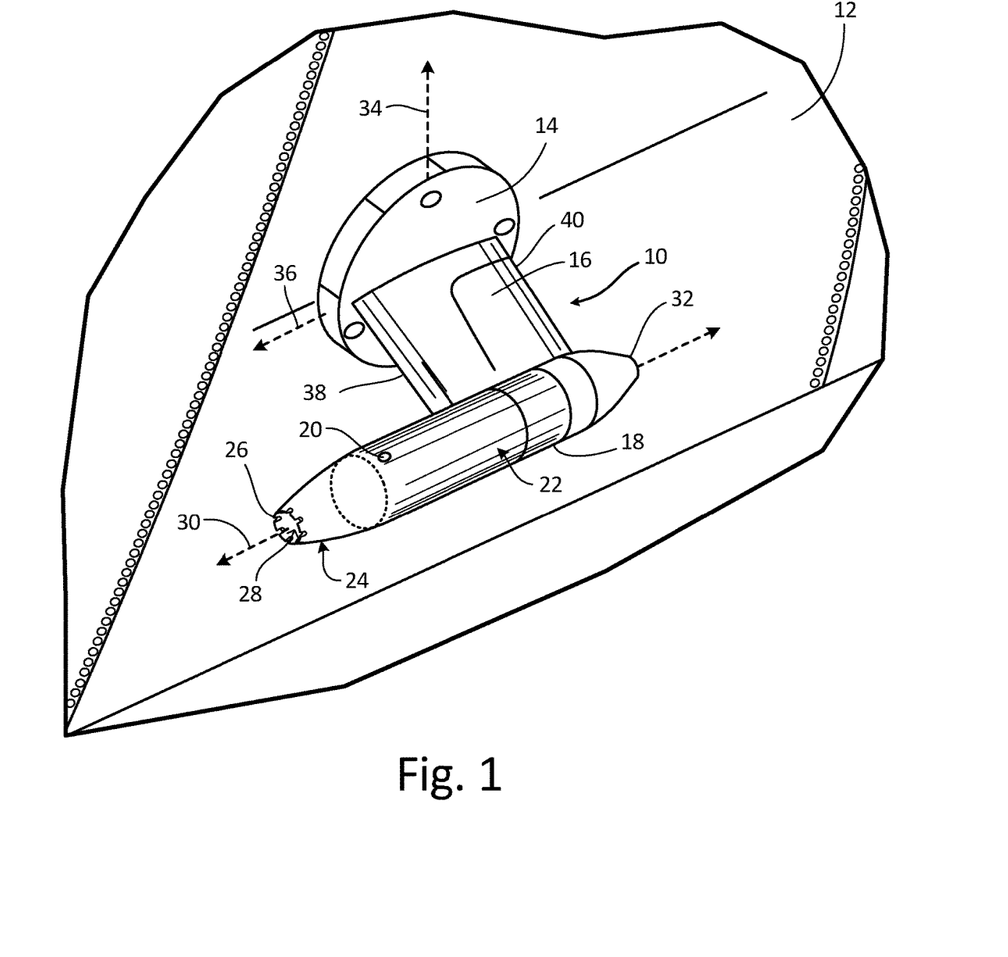
FIG. 1 is a perspective view of an air data probe attached to an aircraft, the air data probe having a turbulence-producing geometry that produces a turbulent boundary layer of airflow that extends from a tip to an air data sensing port.

FIG. 1 is a perspective view of air data probe 10 attached to aircraft 12. As illustrated in FIG. 1, air data probe 10 includes mounting plate 14, strut 16, probe body 18, and air data sensing port 20 disposed in probe body 18. Probe body 18 includes barrel region 22, tapered head region 24, and tip 26. Tapered head region 24 extends forward from barrel region 22 and terminates at tip 26 at a forward-most end of probe body 18. Tip 26 is an annular tip extending about a circumference of an inlet to air data sensing port 28 configured for sensing total pressure (e.g., stagnation pressure) of airflow across probe body 18. Probe body 18 extends along longitudinal axis 30 that extends through probe body 18 from tip 26 to aft end 32 of probe body 18. As further illustrated, probe body 18 has a turbulence-producing geometry originating at tip 26. As in the example of FIG. 1 (and as further described below with respect to FIG. 2), the turbulence-producing geometry can include a crenulated geometry including a plurality of projections formed at tip 26, each of the plurality of projections separated by one of a plurality of notches. The turbulence-producing geometry produces a turbulent boundary layer of airflow over an exterior of probe body 18 that extends from tip 26 along probe body 18 and over the location of air data sensing port 20. In other examples, such as the examples of FIGS. 3A-3F, probe body 18 can have turbulence-producing geometries other than a crenulated geometry that produce the turbulent boundary layer of airflow that extends from tip 26 along probe body 18 and over the location of air data sensing port 20.

Mounting plate 14 is configured to mount air data probe 10 to an exterior of aircraft 12 via one or more screws, bolts, rivets, or other attachment devices. As illustrated, mounting plate 14 defines a mounting plane that extends along perpendicular axes 34 and 36. Strut 16 extends between mounting plate 14 and probe body 18 to support probe body 18 in a stream of airflow passing over the exterior of aircraft 12. Strut 16, as in the example of FIG. 1, extends in a direction that is generally orthogonal to the mounting plane defined by axes 34 and 36 of mounting plate 14. Strut 16 includes forward end 38 proximate tip 26 of probe body 18 and aft end 40 proximate aft end 32 of probe body 18. As illustrated, aft end 40 of strut 16 can be adjacent to aft end 32 of probe body 18.

Strut 16 both supports probe body 18 in the stream of airflow passing over the exterior of aircraft 12 and houses pneumatic and/or electrical connections between air data sensing ports 20 and 28 (or other ports defined in probe body 18) and pressure sensors and/or controller devices of an air data system housed within an interior of aircraft 12. That is, air data sensing ports 20 and 28, as well as other air data sensing ports that can be included in probe body 18 (not illustrated), can be pneumatically connected to one or more pressure sensors (e.g., pressure transducers) for sensing pressures, such as static air pressure (e.g., via air data sensing port 20), total air pressure (e.g., via air data sensing port 28), or other pressures of air moving across probe body 18.

Probe body 18, as illustrated in FIG. 1, extends along longitudinal axis 30 between tip 26 and aft end 32 of probe body 18. Barrel region 22 of probe body 18 is, in this example, a cylindrical region of probe body 18 disposed aft of tapered head region 24. In other examples, barrel region 22 can be non-cylindrical, such as an elliptical cylinder or other non-cylindrical region. Longitudinal axis 30 extends generally in a direction of forward flight of aircraft 12. That is, tip 26 is oriented toward a nose of aircraft 12 and aft end 32 is oriented toward a tail of aircraft 12, such that a direction from aft end 32 to tip 26 along longitudinal axis 30 corresponds generally with a forward direction of flight of aircraft 12.

Air data sensing port 20 is formed integrally with an exterior of probe body 18 and is disposed aft of tip 26. As illustrated, probe body 18 has a first side (e.g., a top side) and a second side (e.g., a bottom side) with respect to strut 16. Air data sensing port 20 is disposed in the first side (e.g., top side) of probe body 18 in this example. Though not illustrated in FIG. 1, air data probe 10 can include additional air data sensing ports, such as an air data sensing port disposed in the second side of probe body 18 with respect to strut 16 (e.g., opposite air data sensing port 20) or any other location on probe body 18. In some examples, air data probe 10 can include more than two air data sensing ports.

In operation, as air flows over probe body 18 (e.g., during flight), a portion of the airflow is directed into air data sensing port 20 (e.g., a static pressure port configured for use in measuring static pressure of airflow over probe body 18), which is pneumatically connected to one or more pressure transducers or other pressure sensors. Outputs of the pressure sensors are electrically connected to a controller or other computer device (e.g., included within an air data system) including one or more processors and computer-readable memory encoded with instructions that, when executed by the one or more processors, cause the controller device to determine one or more air data outputs based on the measured pressure(s) received from the pressure sensors via air data sensing port 20 (and/or other air data sensing ports disposed in probe body 18). Examples of such air data outputs include, but are not limited to, pressure altitude, altitude rate (e.g., vertical speed), airspeed, Mach number, angle of attack, and angle of sideslip.

Airflow over the turbulence-producing geometry of probe body 18 originating at tip 26 (i.e., the crenulated geometry of tip 26 in the example of FIG. 1) produces a turbulent boundary layer of airflow over the exterior of probe body 18. The turbulent boundary layer remains attached adjacent to the exterior surface of probe body 18. As the air flows across the surface of probe body 18, an adverse pressure gradient created by the flow can cause flow separation in a region of probe body 18 in which the boundary layer separates from the surface of probe body 18, thereby altering the localized pressures at the flow separation region. Airflow diverted to air data sensing port 20 (or other similar air data sensing ports in probe body 18) from an attached boundary layer produces predictable and consistent pressure measurements. In contrast, airflow diverted to air data sensing port 20 from the flow separation region can result in inconsistent pressure measurements.

Flow separation of the turbulent boundary layer of airflow over probe body 18 requires a greater magnitude of adverse pressure gradient than would otherwise be required for flow separation to occur under laminar flow conditions. As such, the turbulent boundary layer of airflow produced by the turbulence-producing geometry of probe body 18 (i.e., the crenulated geometry of tip 26 in the example of FIG. 1) produces an attached boundary layer of airflow over a greater proportion of the exterior surface of probe body 18 than would otherwise be experienced with a laminar boundary layer. Accordingly, the turbulence-producing geometry of probe body 18 can help to ensure that the attached turbulent boundary layer extends along the exterior of probe body 18 leading to, in the vicinity of, and over air data sensing ports disposed in probe body 18 (e.g., air data sensing port 20) aft of tip 26, thereby enabling the air data sensing ports to experience attached boundary layer flow for an entire defined flight envelope of aircraft 12 (e.g., a flight envelope including relatively low Reynolds numbers on the order of $10^6$ m$^{-1}$ that may be experienced at high altitudes). The turbulence-producing geometry of probe body 18 can therefore increase a consistency of pressure measurements at air data sensing ports disposed in probe body 18 aft of tip 26, thereby increasing a consistency and reliability of air data output values generated based on the pressure measurements.

Figure 2:
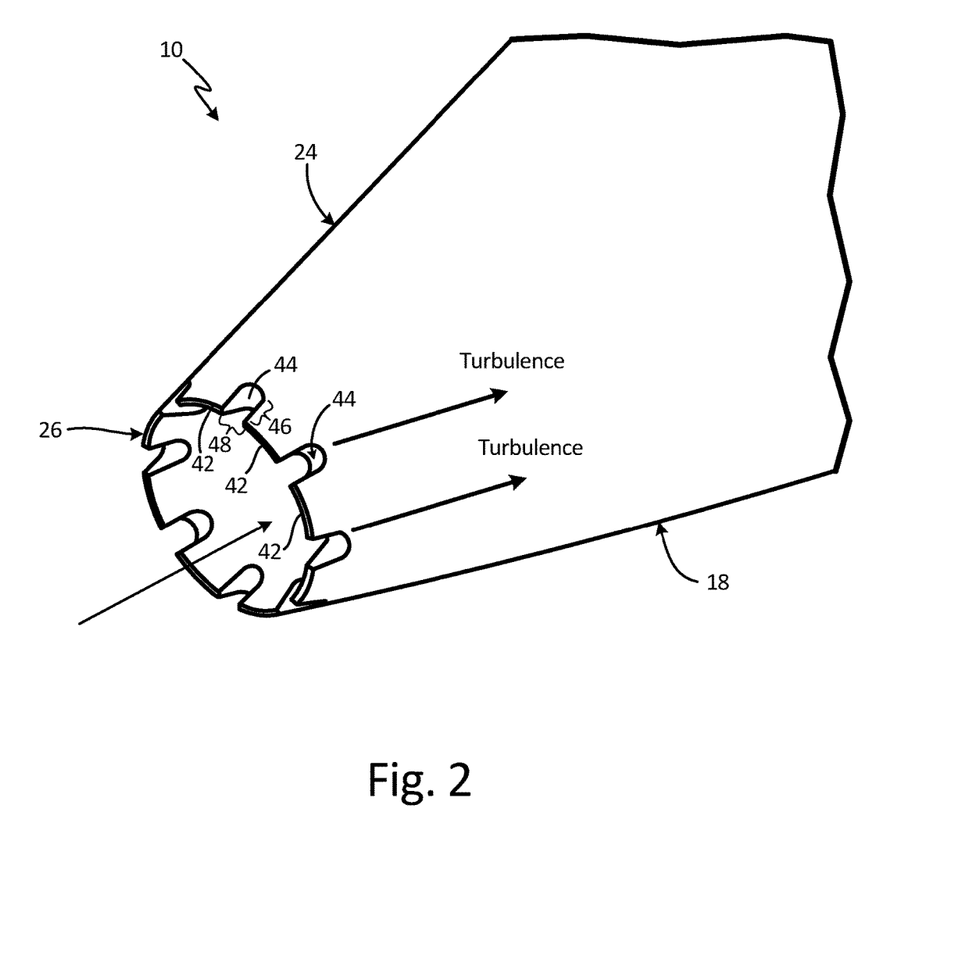
FIG. 2 is a perspective view of a portion of the tapered head region and the tip of the air data probe of FIG. 1.

FIG. 2 is a perspective view of a portion of tapered head region 24 and tip 26 of air data probe 10 of FIG. 1. As illustrated in FIG. 2, tip 26 includes a plurality of projections 42 formed at tip 26. Each of projections 42 is separated by one of a plurality of notches 44. Projections 42 and notches 44 together produce a crenulated turbulence-producing geometry formed at tip 26. As illustrated in FIG. 2, each of projections 42 extends in a forward direction from tapered head region 24. Each of notches 44 has a depth 46 and a width 48. In some examples, notches 44 can be formed by removing material from tip 26, the removal of material forming each of notches 44 and also defining projections 42. In other examples, projections 42 can be formed by adding material to tip 26, the addition of material forming each of projections 42 and also defining notches 44.

As illustrated in FIG. 2, each of projections 42 can be substantially similar in shape, such that a length of each of projections 42 and the corresponding depth 46 of each of notches 44 is uniform. Similarly, a distance between each of projections 42 can be uniform, such that a width of each of projections 42 is uniform and the corresponding width 48 of each of notches 44 is uniform. In other examples, any one or more of projections 42 and notches 44 can be different in size and/or shape (i.e., non-uniform about a circumference of tip 26). Notches 44, in the example of FIG. 2, are formed with a rounded aft end. In other examples, notches 44 can be formed with a squared aft end, a triangular aft end (e.g., a serrated shape), or other formed shape of the aft end. In general, tip 26 can be formed to include any crenulated geometry configured to cause a turbulent boundary layer of airflow over an exterior of probe body 18.

As illustrated in FIG. 2, an oncoming stream of airflow passing over probe body 18 flows across projections 42 and notches 44 at forward-most tip 26. A portion of the airflow is diverted over an exterior of tapered head portion 24 and across the exterior of the remainder of probe body 18, eventually encountering air data sensing port 20 at a location aft of tip 26. The crenulated geometry formed by projections 42 and notches 44 causes a turbulent boundary layer of airflow that extends from tip 26 across the exterior of probe body 18 leading to, in the vicinity of, and over port location 20. As such, the crenulated geometry at tip 26 helps to produce an attached boundary layer of airflow across air data sensing port 20, thereby increasing consistency of pressure measurements at air data sensing port 20 and the corresponding air data output values generated based on the pressure measurements.

Figure 3A:
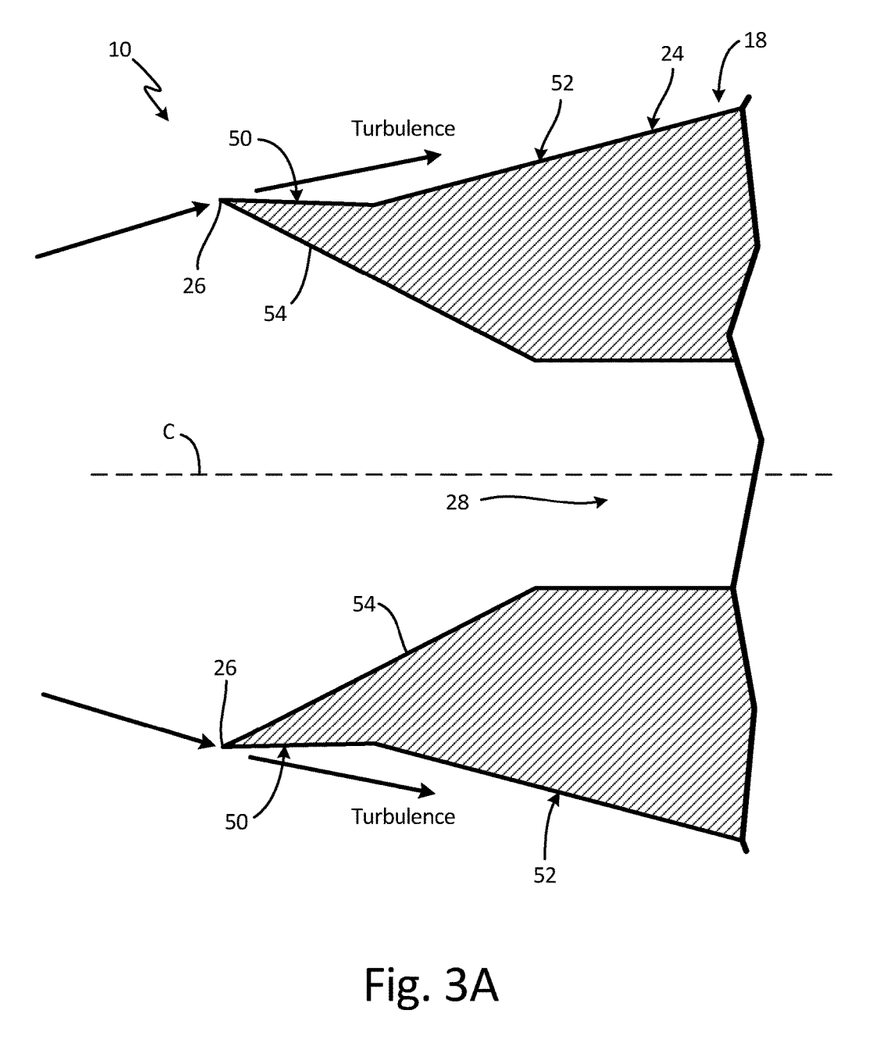
FIG. 3A is a schematic cross-sectional view of one embodiment of a probe body having a turbulence-producing geometry including a non-converging outer surface region that extends from the tip to a converging outer surface region.

FIGS. 3A-3F are schematic cross-sectional views of alternate embodiments of probe body 18 having turbulence-producing geometries originating at tip 26 to produce a turbulent boundary layer of airflow that extends from tip 26 to a location of air data sensing port 20. FIG. 3A is a schematic cross-sectional view of one embodiment of probe body 18 having a turbulence-producing geometry including a non-converging outer surface region 50 that extends from tip 26 to converging outer surface region 52.

As illustrated in FIG. 3A, tapered head region 24 of probe body 18 includes non-converging outer surface region 50. Non-converging outer surface region 50 originates at tip 26. Tip 26, in the example of FIG. 2, is an annular tip at a forward-most end of tapered head region 24 and is defined by the intersection of non-converging outer surface region 50 of tapered head region 24 with inner wall 54. Inner wall 54 extends from tip 26 in an aft direction and is angled toward center line C that extends through a centroid of probe body 18 to define an inlet to air data sensing port 28 (e.g., configured for sensing total pressure of airflow across probe body 18). Non-converging outer surface region 50 extends in an aft direction from tip 26 to an intersection with converging outer surface region 52. Non-converging outer surface region 50 is defined by a region of an outer surface of tapered head region 24 which, if projected forward, would not converge to an intersection point. Converging outer surface region 52 is defined by a region of an outer surface of tapered head region 24 which, if projected forward, would converge to an intersection point.

As illustrated in FIG. 3A, a portion of an oncoming stream of airflow passing over tip 26 is diverted over the exterior of probe body 18 across non-converging outer surface region 50 and converging outer surface region 52, eventually encountering air data sensing port 20 at a location aft of tip 26. Non-converging outer surface region 50 and converging outer surface region 52 form a turbulence-producing geometry originating at tip 26 that produces a turbulent boundary layer of airflow that extends from tip 26 to a location of air data sensing port 20 aft of tip 26. As such, the turbulence-producing geometry defined by non-converging outer surface region 50 and converging outer surface region 52 helps to produce an attached boundary layer of airflow leading to, in the vicinity of, and across air data sensing port 20, thereby increasing consistency of pressure measurements at air data sensing port 20.

Figure 3B:
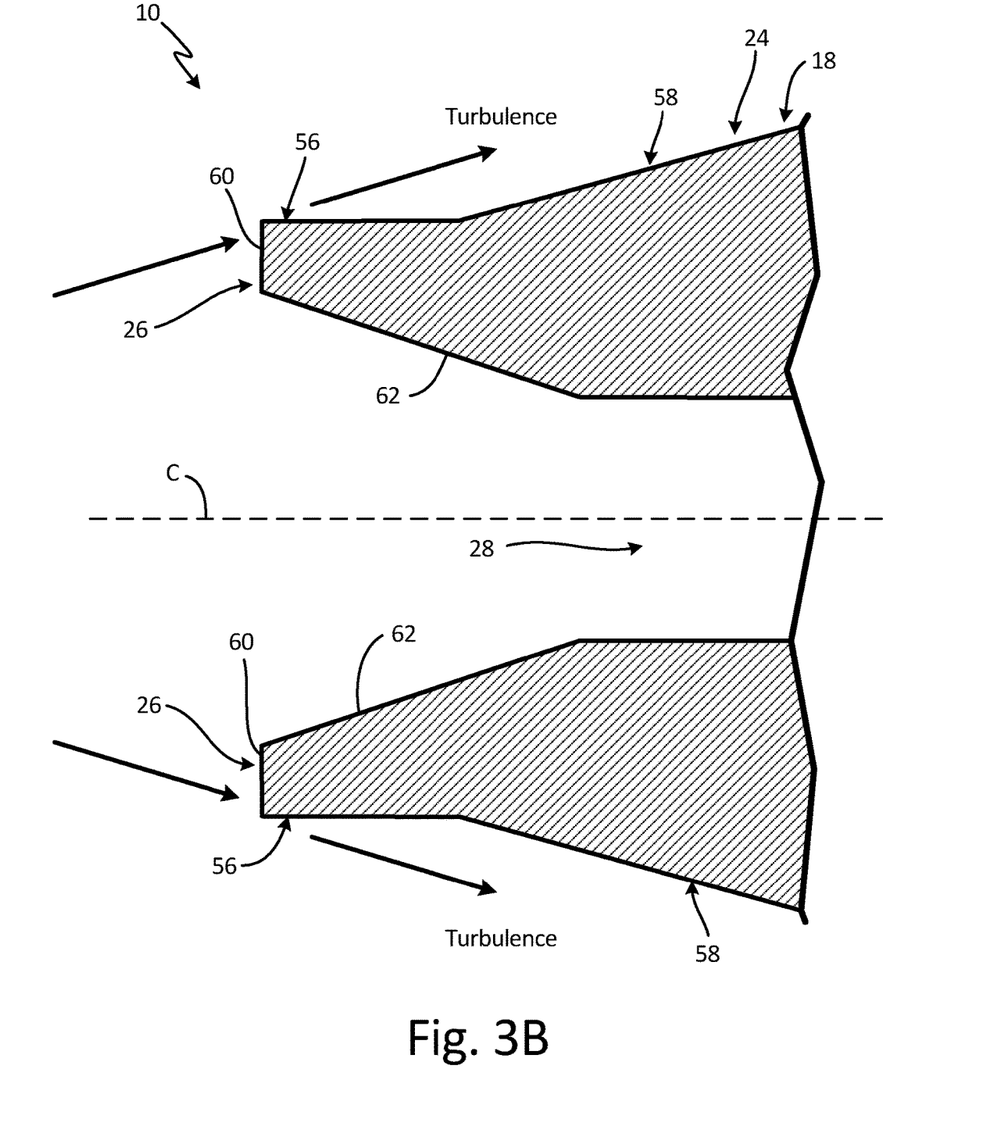
FIG. 3B is a schematic cross-sectional view of another embodiment of the probe body having a turbulence-producing geometry including a blunt tip and a non-converging outer surface region that extends from the blunt tip to a converging outer surface region.

FIG. 3B is a schematic cross-sectional view of another embodiment of probe body 18 having a turbulence-producing geometry including blunt tip 26 and non-converging outer surface region 56 that extends from blunt tip 26 to converging outer surface region 58. As illustrated in FIG. 3B, tapered head region 24 of probe body 18 includes non-converging outer surface region 56 that originates at tip 26 and extends in an aft direction to converging outer surface region 58 of tapered head region 24. Tip 26, in the example of FIG. 3B, is a blunt annular tip that includes end surface 60 at a forward-most end of tapered head region 24. End surface 60 of tip 26 is orthogonal to center line C that extends through a centroid of probe body 18. Inner wall 62 extends from end surface 60 in an aft direction and is angled toward center line C to define an inlet to air data sensing port 28 (e.g., a total pressure sensing port). Non-converging outer surface region 56 extends in an aft direction from end surface 60 of tip 26 to an intersection with converging outer surface region 58. Non-converging outer surface region 56 is defined by a region of an outer surface of tapered head region 24 which, if projected forward, would not converge to an intersection point. Converging outer surface region 58 is defined by a region of an outer surface of tapered head region 24 which, if projected forward, would converge to an intersection point.

As illustrated in FIG. 3B, an oncoming stream of airflow passing over probe body 18 encounters end surface 60 of tip 26. A portion of the airflow is diverted over an exterior of tapered head portion 24 and across the exterior of the remainder of probe body 18, eventually encountering air data sensing port 20 at a location aft of tip 26. End surface 60 of tip 26, non-converging outer surface region 56, and converging outer surface region 58 form a turbulence-producing geometry originating at tip 26 that produces a turbulent boundary layer of airflow that extends from tip 26 to a location of air data sensing port 20 aft of tip 26. As such, the turbulence-producing geometry defined by end surface 60 of tip 26, non-converging outer surface region 56, and converging outer surface region 58 helps to produce an attached boundary layer of airflow leading to, in the vicinity of, and across air data sensing port 20, thereby increasing consistency of pressure measurements at air data sensing port 20.

Figure 3C:
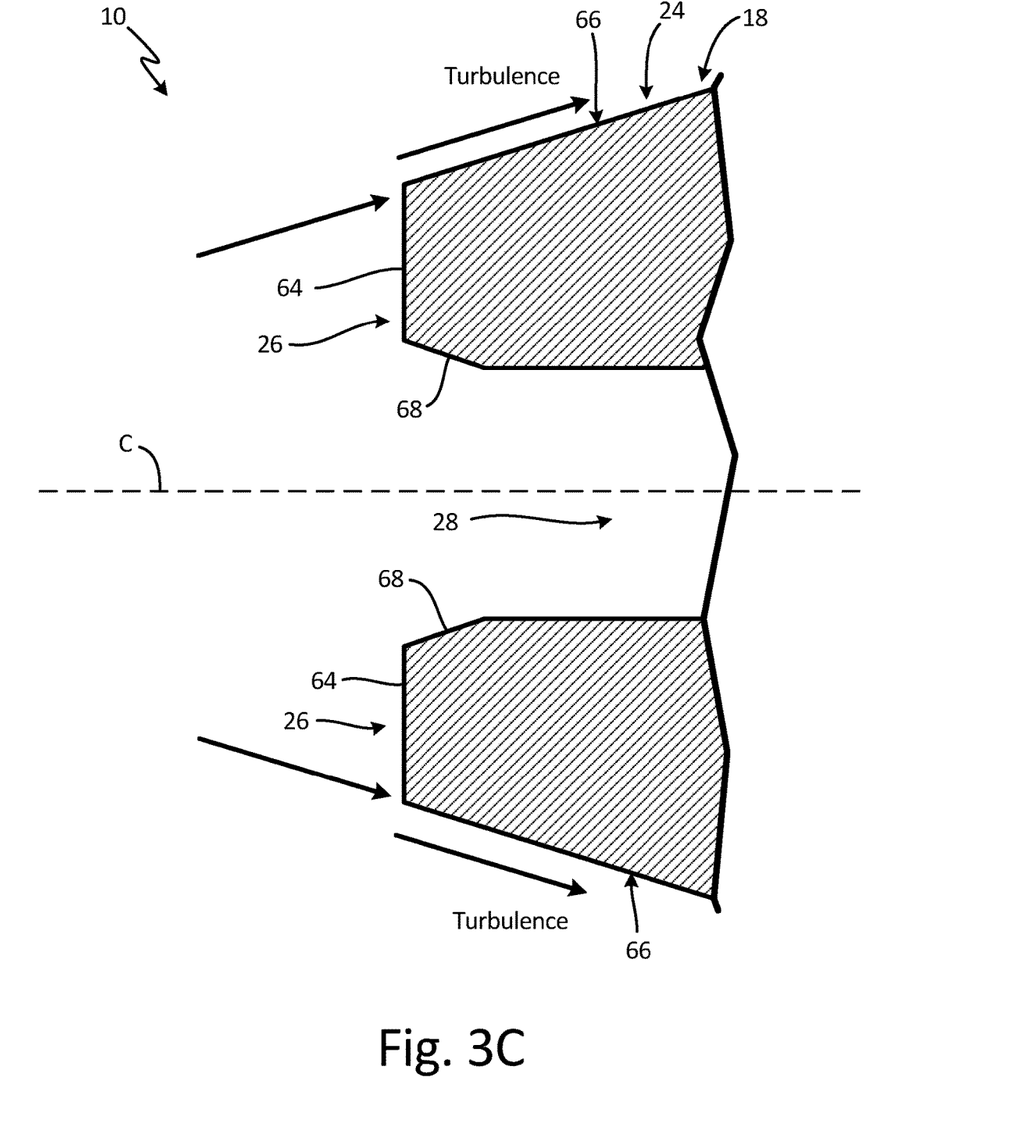
FIG. 3C is a schematic cross-sectional view of another embodiment of the probe body having a turbulence-producing geometry including a blunt tip having an end surface that is orthogonal to a central axis of the probe body.

FIG. 3C is a schematic cross-sectional view of another embodiment of probe body 18 having a turbulence-producing geometry including blunt tip 26 having end surface 64 that is orthogonal to central axis C of probe body 18. As illustrated in FIG. 3C, tapered head region 24 of probe body 18 includes converging outer surface region 66 that originates at end surface 64 of tip 26 and extends in an aft direction toward barrel region 22 (FIG. 1). Converging outer surface region 66 is defined by a region of an outer surface of tapered head region 24 which, if projected forward, would converge to an intersection point. Tip 26, in the example of FIG. 3C, is a blunt annular tip that includes end surface 64 at a forward-most end of tapered head region 24. End surface 64 of tip 26 is orthogonal to center line C that extends through a centroid of probe body 18. Inner wall 68 extends from end surface 64 in an aft direction and is angled toward center line C to define an inlet to air data sensing port 28.

As illustrated in FIG. 3C, an oncoming stream of airflow passing over probe body 18 encounters end surface 64 of tip 26. A portion of the airflow is diverted over an exterior of tapered head portion 24 and across the exterior of the remainder of probe body 18, eventually encountering air data sensing port 20 at a location aft of tip 26. End surface 64 of tip 26 and converging outer surface region 66 form a turbulence-producing geometry originating at tip 26 that produces a turbulent boundary layer of airflow that extends from tip 26 to a location of air data sensing port 20 aft of tip 26. As such, the turbulence-producing geometry defined by end surface 64 of tip 26 and converging outer surface region 66 helps to produce an attached boundary layer of airflow leading to, in the vicinity of, and across air data sensing port 20 that increases consistency of pressure measurements at air data sensing port 20 and the corresponding air data output values generated based on the measurements.

Figure 3D:
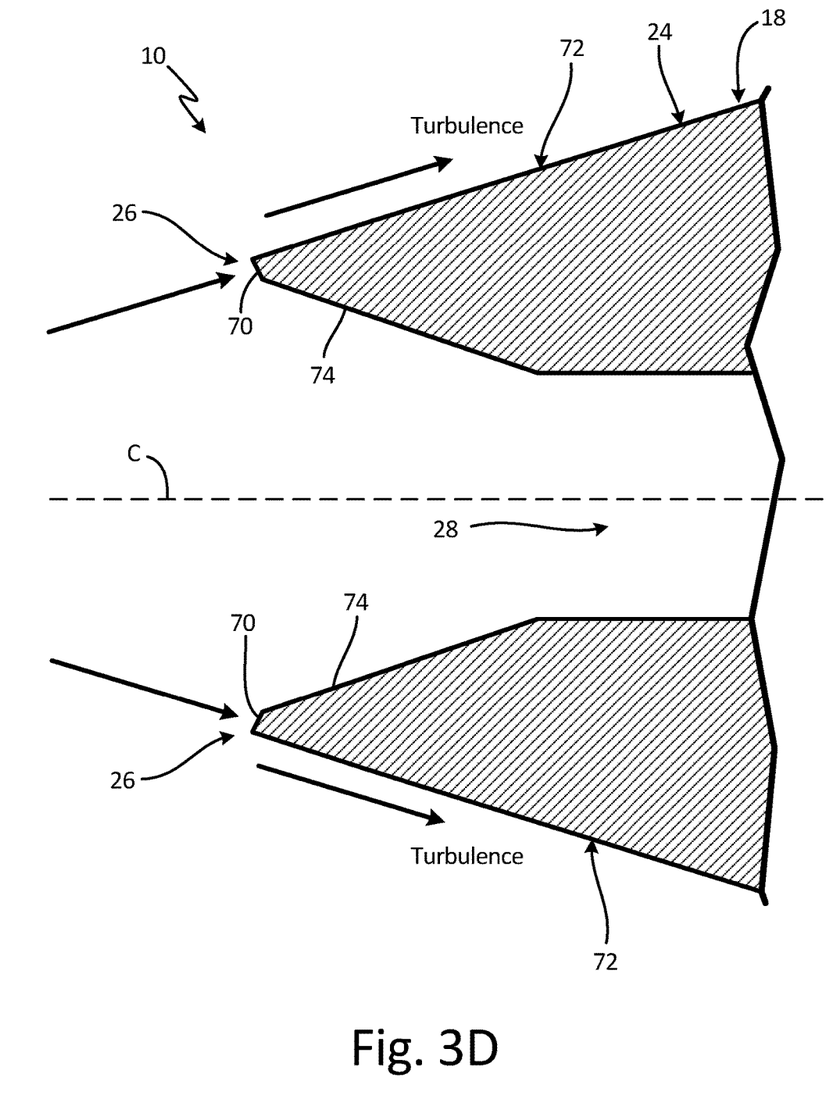
FIG. 3D is a schematic cross-sectional view of another embodiment of the probe body having a turbulence-producing geometry including a blunt tip having an end surface that is inclined with respect to a central axis of the probe body.

FIG. 3D is a schematic cross-sectional view of another embodiment of probe body 18 having a turbulence-producing geometry including blunt tip 26 having end surface 70 that is inclined with respect to central axis C of probe body 18. As illustrated in FIG. 3D, tapered head region 24 of probe body 18 includes converging outer surface region 72 that originates at end surface 70 of tip 26 and extends in an aft direction toward barrel region 22 (FIG. 1). Converging outer surface region 72 is defined by a region of an outer surface of tapered head region 24 which, if projected forward, would converge to an intersection point. Tip 26, in the example of FIG. 3D, is a blunt annular tip that includes end surface 70 at a forward-most end of tapered head region 24. End surface 70 of tip 26 is inclined with respect to center line C that extends through a centroid of probe body 18. While illustrated in the example of FIG. 3D as inclined inwardly toward central axis C of probe body 18, in other examples, end surface 70 can be inclined outwardly away from central axis C. Inner wall 74 extends from end surface 70 in an aft direction and is angled toward center line C to define an inlet to air data sensing port 28.

As illustrated in FIG. 3D, an oncoming stream of airflow passing over probe body 18 encounters end surface 70 of tip 26. A portion of the airflow is diverted over an exterior of tapered head portion 24 and across the exterior of the remainder of probe body 18, eventually encountering air data sensing port 20 at a location aft of tip 26. End surface 70 of tip 26 and converging outer surface region 70 form a turbulence-producing geometry originating at tip 26 that produces a turbulent boundary layer of airflow that extends from tip 26 to a location of air data sensing port 20 aft of tip 26. As such, the turbulence-producing geometry defined by end surface 70 of tip 26 and converging outer surface region 72 helps to produce an attached boundary layer of airflow leading to, in the vicinity of, and across air data sensing port 20 that increases consistency of pressure measurements at air data sensing port 20, thereby increasing the consistency and reliability of air data output values generated based on the measurements.

Figure 3E:
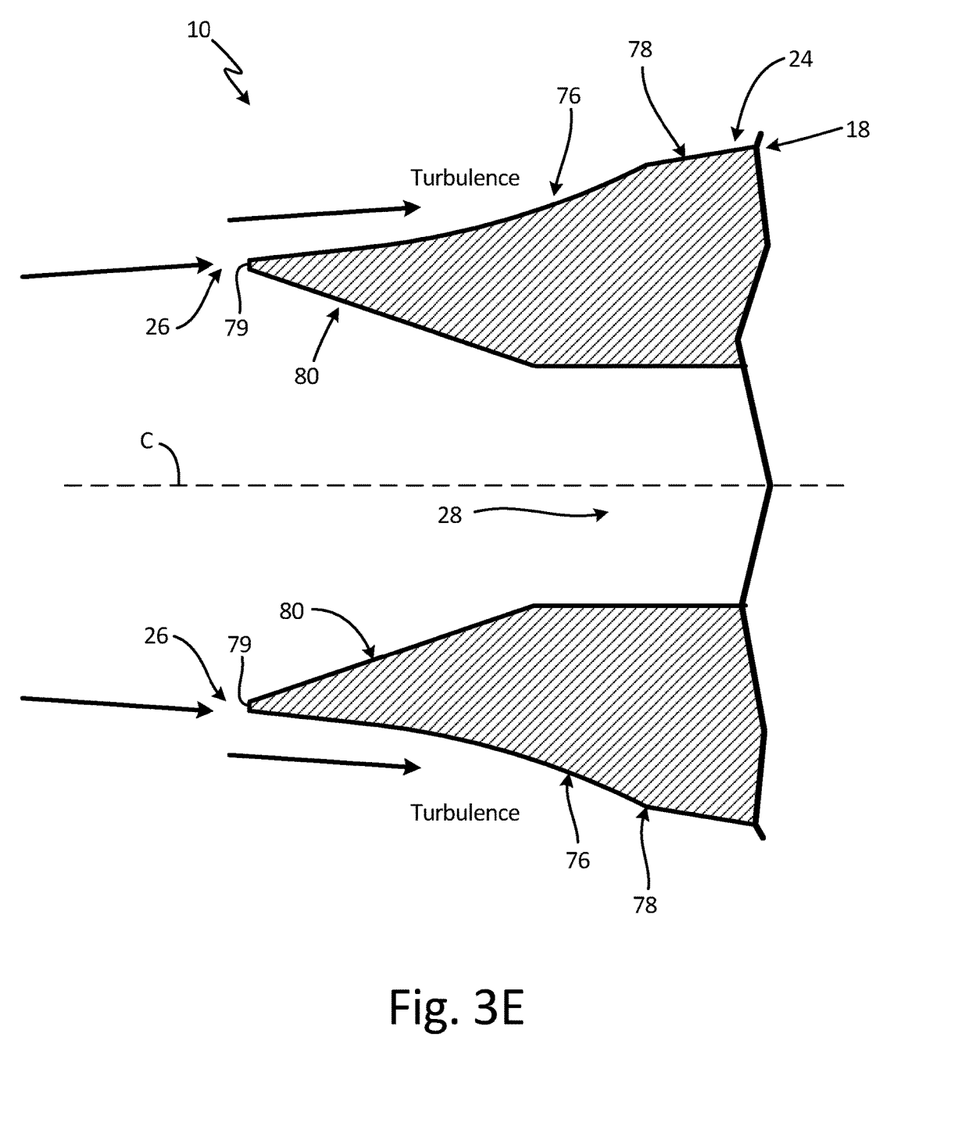
FIG. 3E is a schematic cross-sectional view of another embodiment of the probe body having a turbulence-producing geometry including a concave outer wall region that extends from the tip to a converging outer surface region.

FIG. 3E is a schematic cross-sectional view of another embodiment of probe body 18 having a turbulence-producing geometry including concave outer wall region 76 that extends from tip 26 to converging outer surface region 78. As illustrated in FIG. 3E, tapered head region 24 of probe body 18 includes concave outer wall region 76 that originates at tip 26. Tip 26, in the example of FIG. 3E, is a blunt annular tip that includes end surface 79 at a forward-most end of tapered head region 24. Inner wall 80 extends from end surface 79 of tip 26 in an aft direction and is angled toward center line C that extends through a centroid of probe body 18 to define an inlet to air data sensing port 28. Concave outer wall region 76 extends in an aft direction from end surface 79 of tip 26 to an intersection with converging outer surface region 78. Concave outer wall region 76 is defined by a region of an outer surface of tapered head region 24 that is concave up (i.e., having a continuously increasing slope with respect to center line C) from tip 26 to the intersection with converging outer surface region 78. Converging outer surface region 78 is defined by a region of an outer surface of tapered head region 24 which, if projected forward, would converge to an intersection point.

As illustrated in FIG. 3E, a portion of an oncoming stream of airflow passing over tip 26 is diverted over the exterior of probe body 18 across concave outer wall region 76 and converging outer surface region 78, eventually encountering air data sensing port 20 at a location aft of tip 26. Concave outer wall region 76 and converging outer surface region 78 form a turbulence-producing geometry originating at tip 26 that produces a turbulent boundary layer of airflow that extends from tip 26 to a location of air data sensing port 20 aft of tip 26. As such, the turbulence-producing geometry defined by concave outer wall region 76 and converging outer surface region 78 helps to produce an attached boundary layer of airflow leading to, in the vicinity of, and across air data sensing port 20, thereby increasing consistency of pressure measurements at air data sensing port 20.

Figure 3F:
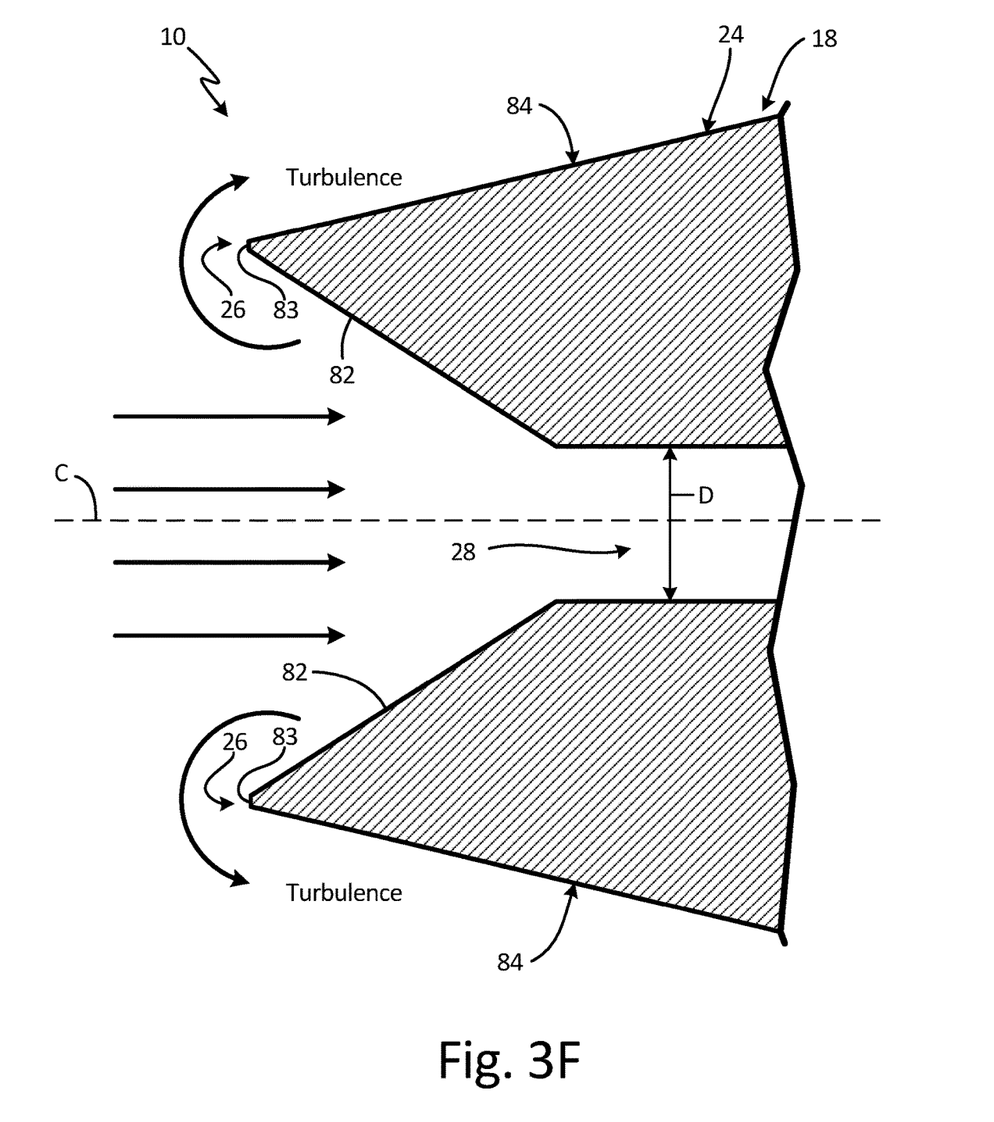
FIG. 3F is a schematic cross-sectional view of another embodiment of the probe body having an interior wall extending from the tip in an aft direction to form an inlet to an air data sensing port that is configured to cause backflow of air over an exterior of the probe body.

FIG. 3F is a schematic cross-sectional view of another embodiment of probe body 18 having interior wall 82 extending from tip 26 in an aft direction to form an inlet to air data sensing port 28 that is configured to cause backflow of air over an exterior of probe body 18. As illustrated in FIG. 3F, tapered head region 24 of probe body 18 includes inner wall 82 that originates at tip 26. Tip 26, in the example of FIG. 3F, is a blunt annular tip that includes end surface 83 at a forward-most end of tapered head region 24. Converging outer surface region 84 is defined by a region of an outer surface of tapered head region 24 which, if projected forward, would converge to an intersection point. Inner wall 82 extends from end surface 83 of tip 26 in an aft direction and is angled toward center line C that extends through a centroid of probe body 18 to define an inlet to air data sensing port 28 having a diameter D configured to cause backflow of air over tip 26 and along outer surface of probe body 18. Diameter D of the inlet to air data sensing port 28 is sized to cause congestion of air flowing into the inlet and subsequent backflow of a portion of the air over tip 26 and along the exterior of probe body 18.

As illustrated in FIG. 3F, a portion of an oncoming stream of airflow passing over probe body 18 is diverted by inner wall 82 into the inlet to air data sensing port 28. Inner wall 82 that is angled to the inlet having diameter D forms a turbulence-producing geometry that produces a turbulent boundary layer of airflow over the exterior of probe body 18 as a portion of the airflow congests at the inlet and flows over tip 26 and along the exterior of probe body 18. The turbulent boundary layer of airflow extends from tip 26 to a location of air data sensing port 20 aft of tip 26. As such, the turbulence-producing geometry defined by inner wall 82 helps to produce an attached boundary layer of airflow leading to, in the vicinity of, and across air data sensing port 20, thereby increasing consistency of pressure measurements at air data sensing port 20.

As described herein, probe body 18 of air data probe 10 includes a turbulence-producing geometry originating at tip 26 that produces a turbulent boundary layer of airflow over an exterior of probe body 18 to reduce boundary layer separation and thereby increase a consistency of measurements at a location of air data sensing port 20 aft of tip 26. The turbulent boundary layer delays flow separation of the airflow over probe body 18, thereby maintaining an attached boundary layer over a greater proportion of the outer surface of probe body 18 than would otherwise be experienced with a laminar boundary layer. As such, the turbulence-producing geometry of probe body 18 originating at tip 26 helps to ensure that an air data sensing port disposed in probe body 18 at any location aft of tip 26 experiences attached boundary layer flow for an entirety of a defined flight envelope for aircraft 12. Accordingly, the turbulence-producing geometry described herein can increase consistency of pressure measurements at air data sensing port 20 (or any air data sensing port disposed in probe body 18 aft of tip 26), thereby increasing consistency and reliability of air data output values generated based on the measurement values.

The following are non-exclusive descriptions of possible embodiments of the present invention.

An air data probe includes a probe body and an air data sensing port disposed in the probe body. The probe body includes a barrel region, a tapered head region extending forward from the barrel region, and a tip at a forward-most end of the tapered head region. The air data sensing port is disposed in the probe body at a port location aft of the tip. The probe body has a turbulence-producing geometry originating at the tip that produces a turbulent boundary layer of airflow that extends from the tip to the port location.

The air data probe of the preceding paragraph can optionally include, additionally and/or alternatively, any one or more of the following features, configurations, and/or additional components.

The turbulence-producing geometry can include a crenulated geometry including a plurality of projections formed at the tip. Each of the plurality of projections can be separated by one of a plurality of notches.

A depth of each of the plurality of notches can be uniform.

A distance between each of the projections formed at the tip can be uniform about a circumference of the tip.

A distance between each of the projections formed at the tip can be non-uniform about a circumference of the tip.

The turbulence-producing geometry can include a non-converging outer surface region that extends from the tip in an aft direction to a converging outer surface region of the tapered head region.

The turbulence-producing geometry can include a blunt tip.

The blunt tip can include an end surface that is orthogonal to a central axis of the probe body.

The blunt tip can include an end surface that is inclined with respect to a central axis of the probe body.

The end surface can be inclined inwardly toward the central axis of the probe body.

The end surface can be inclined outwardly away from the central axis of the probe body.

The turbulence-producing geometry can further include a non-converging outer surface region that extends from the blunt tip in an aft direction to a converging outer surface region of the tapered head region.

The turbulence-producing geometry can include a concave outer wall region that extends from the tip in an aft direction to a converging outer surface region of the tapered head region.

The turbulence-producing geometry can include an interior wall region inclined toward a central axis of the probe body and extending from the tip in an aft direction to a congestion region configured to cause backflow of air over an exterior of the probe body to produce the turbulent boundary layer of airflow that extends from the tip to the port location.

The air data probe can further include a base plate configured to mount the air data probe to an exterior of an aircraft and a strut extending between the base plate and the probe body. The probe body can include a first side and a second side with respect to the strut, the first side opposite the second side. The port location can be on the first side of the probe body.

The air data sensing port can be a first air data sensing port disposed in the probe body at a first port location. The air data probe can further include a second air data sensing port disposed in the probe body at a second port location aft of the tip on the second side of the probe body. The turbulence-producing geometry can further produce the turbulent boundary layer of airflow to extend from the tip to the second port location.

The probe body can extend along a longitudinal axis from the tip to an aft end of the probe body. The longitudinal axis can be parallel to a plane defined by the base plate.

The aft end of the strut can be adjacent to an aft end of the probe body.

The air data sensing port can be configured for use in measuring static air pressure.

An air data probe includes a base plate, a probe body, a strut, a first air data sensing port, and a second air data sensing port. The base plate is configured to mount the air data probe to an exterior of an aircraft. The probe body includes a cylindrical barrel region and a tapered head region extending forward from the cylindrical barrel region and terminating at an annular tip. The probe body extends along a longitudinal axis from the annular tip to an aft end of the probe body. The longitudinal axis is parallel to a plane defined by the base plate. The strut extends between the base plate and the probe body. An aft end of the strut is adjacent the aft end of the probe body. The probe body has a first side and a second side with respect to the strut. The first air data sensing port is disposed in the first side of the probe body at a first port location aft of the annular tip. The second air data sensing port is disposed in the second side of the probe body at a second port location aft of the annular tip. The second port location is opposite the first port location. The probe body has a turbulence-producing geometry originating at the annular tip. The turbulence-producing geometry produces a turbulent boundary layer of airflow that extends along an exterior of the probe body from the annular tip to each of the first port location and the second port location.

The air data probe of the preceding paragraph can optionally include, additionally and/or alternatively, any one or more of the following features, configurations, and/or additional components.

Each of the first and second port locations can be configured for use in measuring static air pressure.

The turbulence-producing geometry can include a crenulated geometry including a plurality of projections formed at the annular tip. Each of the plurality of projections can be separated by one of a plurality of notches.

A depth of each of the plurality of notches can be uniform.

A distance between each of the projections formed at the annular tip can be uniform about a circumference of the annular tip.

The turbulence-producing geometry can include a non-converging outer surface region that extends from the annular tip in an aft direction to a converging outer surface region of the tapered head region.

The turbulence-producing geometry can include a blunt annular tip.

The blunt annular tip can include an end surface that is orthogonal to a central axis of the probe body.

The blunt annular tip can include an end surface that is inclined with respect to a central axis of the probe body.

The end surface can be inclined inwardly toward the central axis of the probe body.

The end surface can be inclined outwardly away from the central axis of the probe body.

The turbulence-producing geometry can further include a non-converging outer surface region that extends from the blunt annular tip in an aft direction to a converging outer surface region of the tapered head region.

The turbulence-producing geometry can include a concave outer wall region that extends from the annular tip in an aft direction to a converging outer surface region of the tapered head region.

The turbulence-producing geometry can include an interior wall region inclined toward a central axis of the probe body and extending from the annular tip in an aft direction to a congestion region configured to cause backflow of air over an exterior of the probe body to produce the turbulent boundary layer of airflow that extends from the annular tip to each of the first port location and the second port location.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air data probe comprising:
    a probe body comprising a barrel region, a tapered head region extending forward from the barrel region, and a tip at a forward-most end of the tapered head region; and
    an air data sensing port disposed in the probe body at a port location aft of the tip,
    wherein the probe body has a turbulence-producing geometry originating at the tip that produces a turbulent boundary layer of airflow that extends from the tip to the port location.

2. The air data probe of claim 1,
    wherein the turbulence-producing geometry comprises a crenulated geometry including a plurality of projections formed at the tip, each of the plurality of projections separated by one of a plurality of notches.

3. The air data probe of claim 2,
    wherein a depth of each of the plurality of notches is uniform.

4. The air data probe of claim 2,
    wherein a distance between each of the projections formed at the tip is uniform about a circumference of the tip.

5. The air data probe of claim 1,
    wherein the turbulence-producing geometry comprises:
        a non-converging outer surface region that extends from the tip in an aft direction to a converging outer surface region of the tapered head region.

6. The air data probe of claim 1,
    wherein the turbulence-producing geometry comprises a blunt tip.

7. The air data probe of claim 6,
    wherein the blunt tip comprises an end surface that is orthogonal to a central axis of the probe body.

8. The air data probe of claim 6,
    wherein the blunt tip comprises an end surface that is inclined with respect to a central axis of the probe body.

9. The air data probe of claim 8,
    wherein the end surface is inclined inwardly toward the central axis of the probe body.

10. The air data probe of claim 8,
    wherein the end surface is inclined outwardly away from the central axis of the probe body.

11. The air data probe of claim 6,
    wherein the turbulence-producing geometry further comprises:
        a non-converging outer surface region that extends from the blunt tip in an aft direction to a converging outer surface region of the tapered head region.

12. The air data probe of claim 1,
wherein the turbulence-producing geometry comprises a concave outer wall region that extends from the tip in an aft direction to a converging outer surface region of the tapered head region.

13. The air data probe of claim 1,
wherein the turbulence-producing geometry comprises an interior wall region inclined toward a central axis of the probe body and extending from the tip in an aft direction to a congestion region configured to cause backflow of air over an exterior of the probe body to produce the turbulent boundary layer of airflow that extends from the tip to the port location.

14. The air data probe of claim 1, further comprising:
a base plate configured to mount the air data probe to an exterior of an aircraft; and
a strut extending between the base plate and the probe body;
wherein the probe body comprises a first side and a second side with respect to the strut, the first side opposite the second side; and
wherein the port location is on the first side of the probe body.

15. The air data probe of claim 14, wherein the air data sensing port is a first air data sensing port disposed in the probe body at a first port location, the air data probe further comprising:
a second air data sensing port disposed in the probe body at a second port location aft of the tip on the second side of the probe body;
wherein the turbulence-producing geometry further produces the turbulent boundary layer of airflow to extend from the tip to the second port location.

16. The air data probe of claim 14,
wherein the probe body extends along a longitudinal axis from the tip to an aft end of the probe body; and
wherein the longitudinal axis is parallel to a plane defined by the base plate.

17. The air data probe of claim 14:
wherein an aft end of the strut is adjacent to an aft end of the probe body.

18. The air data probe of claim 1,
wherein the air data sensing port is configured for use in measuring static air pressure.

19. An air data probe comprising:
a base plate configured to mount the air data probe to an exterior of an aircraft;
a probe body comprising a cylindrical barrel region and a tapered head region extending forward from the cylindrical barrel region and terminating at an annular tip, the probe body extending along a longitudinal axis from the annular tip to an aft end of the probe body, the longitudinal axis parallel to a plane defined by the base plate;
a strut extending between the base plate and the probe body, an aft end of the strut adjacent the aft end of the probe body, wherein the probe body has a first side and a second side with respect to the strut;
a first air data sensing port disposed in the first side of the probe body at a first port location aft of the annular tip; and
a second air data sensing port disposed in the second side of the probe body at a second port location aft of the annular tip, the second port location opposite the first port location,
wherein the probe body has a turbulence-producing geometry originating at the annular tip that produces a turbulent boundary layer of airflow that extends along an exterior of the probe body from the annular tip to each of the first port location and the second port location.

20. The air data probe of claim 19,
wherein each of the first and second port locations are configured for use in measuring static air pressure.

\* \* \* \* \*